(12) United States Patent
Ferguson et al.

(10) Patent No.: US 7,506,097 B2
(45) Date of Patent: Mar. 17, 2009

(54) METHOD AND APPARATUS FOR INSTALLING DATA IN A MEMORY ON A WORK MACHINE

(75) Inventors: Alan L. Ferguson, Peoria, IL (US); Steven W. O'Neal, Bartonville, IL (US); Daniel C. Wood, East Peoria, IL (US)

(73) Assignee: Caterpillar, Inc., Peoria, IL (US)

( * ) Notice: Subject to any disclaimer, the term of this patent is extended or adjusted under 35 U.S.C. 154(b) by 442 days.

(21) Appl. No.: 09/962,706

(22) Filed: Sep. 25, 2001

(65) Prior Publication Data

US 2003/0061435 A1 Mar. 27, 2003

(51) Int. Cl.
*G06F 12/00* (2006.01)
(52) U.S. Cl. ........................... 711/103; 711/162
(58) Field of Classification Search ................. None
See application file for complete search history.

(56) References Cited

U.S. PATENT DOCUMENTS

| | | | |
|---|---|---|---|
| 4,780,855 A * | 10/1988 | Iida et al. | 365/185.22 |
| 5,483,465 A | 1/1996 | Grube et al. | |
| 5,517,434 A * | 5/1996 | Hanson et al. | 361/683 |
| 5,590,373 A | 12/1996 | Whitley et al. | |
| 5,671,436 A | 9/1997 | Morris et al. | |
| 5,764,992 A | 6/1998 | Kullick et al. | |
| 5,896,566 A | 4/1999 | Averbuch et al. | |
| 5,909,437 A | 6/1999 | Rhodes et al. | |
| 5,930,704 A | 7/1999 | Kay | |
| 5,938,764 A * | 8/1999 | Klein | 713/1 |
| 5,966,510 A * | 10/1999 | Carbonneau et al. | 714/44 |
| 5,974,312 A | 10/1999 | Hayes, Jr. et al. | |
| 6,006,034 A | 12/1999 | Heath et al. | |
| 6,023,586 A | 2/2000 | Gaisford et al. | |
| 6,023,620 A | 2/2000 | Hansson | |
| 6,063,134 A | 5/2000 | Peters et al. | |
| 6,108,727 A | 8/2000 | Boals et al. | |
| 6,126,327 A | 10/2000 | Bi et al. | |
| 6,131,040 A | 10/2000 | Knuutila et al. | |

(Continued)

FOREIGN PATENT DOCUMENTS

EP 848341 6/1998

(Continued)

OTHER PUBLICATIONS

Anonymous: "How the Self-Repairing Feature Works in Office 2000" Microsoft Office Resouce Kit Journal, Online! Aug. 13, 1999.

*Primary Examiner*—Hyung S Sough
*Assistant Examiner*—Ngoc V Dinh
(74) *Attorney, Agent, or Firm*—Kelsey L. Milman; Liell & McNeil

(57) ABSTRACT

Method and apparatus for installing data stored on electronic control modules on a remotely-located machine. The control modules installed on the machine store information regarding the data which should be stored on the other installed control modules. A processor may poll the control modules to determine if a control module is missing or blank and, if so, determine which data is missing from the machine based upon the information stored on the other control modules. The processor may communicate with an off board system to identify the appropriate software for the blank control module. The software is downloaded and flashed into the blank control module.

27 Claims, 2 Drawing Sheets

U.S. PATENT DOCUMENTS

| | | | |
|---|---|---|---|
| 6,138,009 A | 10/2000 | Birgerson | |
| 6,170,026 B1 | 1/2001 | Kimura et al. | |
| 6,209,127 B1 | 3/2001 | Mori et al. | |
| 6,215,994 B1 | 4/2001 | Schmidt et al. | |
| 6,226,665 B1 | 5/2001 | Deo et al. | |
| 6,226,739 B1 | 5/2001 | Eagle | |
| 6,240,550 B1 | 5/2001 | Nathan et al. | |
| 6,314,565 B1 * | 11/2001 | Kenner et al. | 717/171 |
| 6,360,364 B1 * | 3/2002 | Chen et al. | 711/169 |
| 6,418,555 B2 * | 7/2002 | Mohammed | 717/169 |
| 6,493,871 B1 * | 12/2002 | McGuire et al. | 717/173 |
| 6,842,840 B1 * | 1/2005 | Reohr et al. | 711/172 |
| 6,968,550 B2 * | 11/2005 | Branson et al. | 717/168 |
| 7,176,808 B1 * | 2/2007 | Broad et al. | 340/870.07 |

FOREIGN PATENT DOCUMENTS

| | | |
|---|---|---|
| JP | 10-021061 | 1/1998 |
| JP | 11-158940 | 6/1999 |
| JP | 2000-194562 | 7/2000 |
| WO | WO 00/36502 | 6/2000 |

* cited by examiner

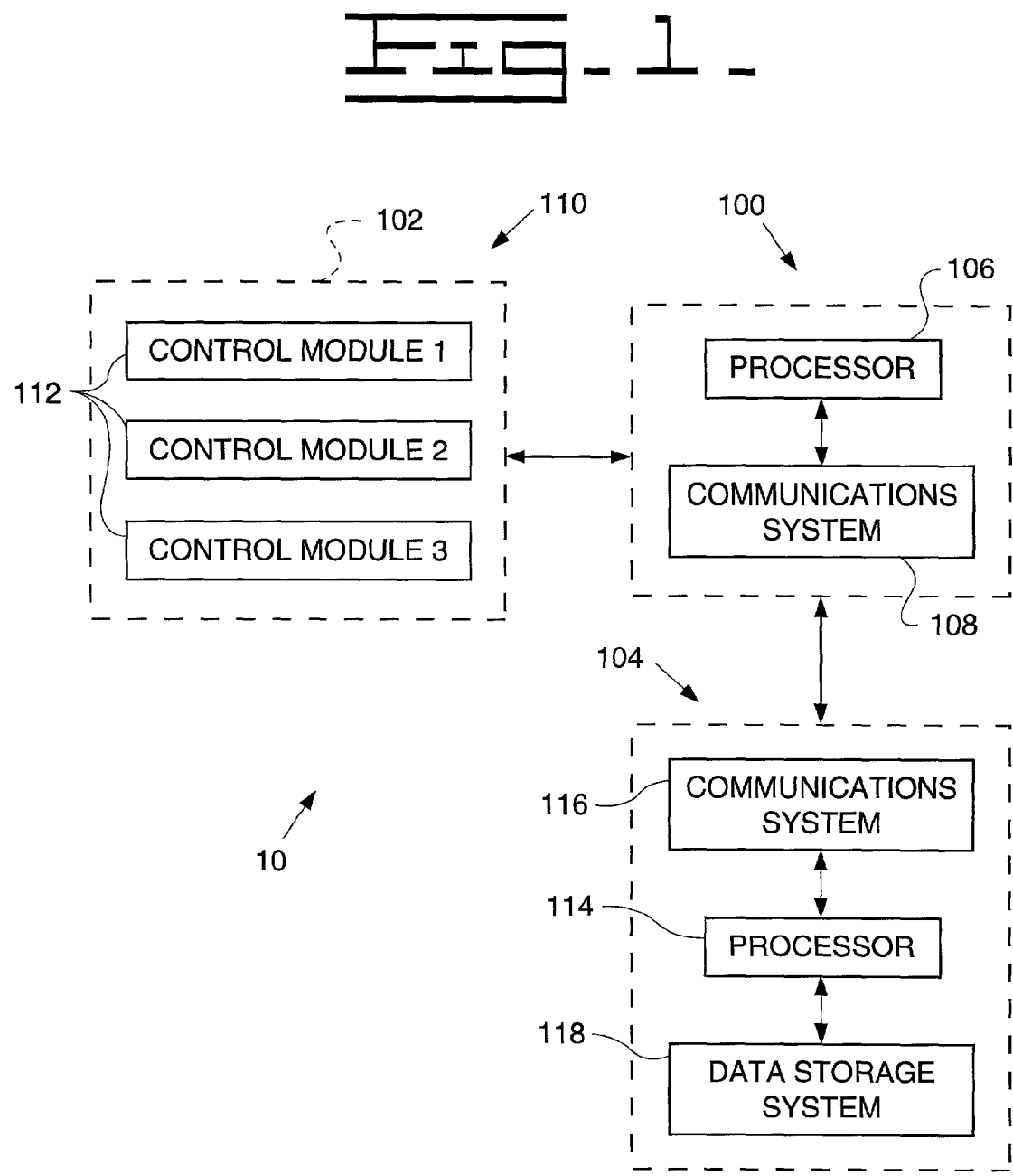

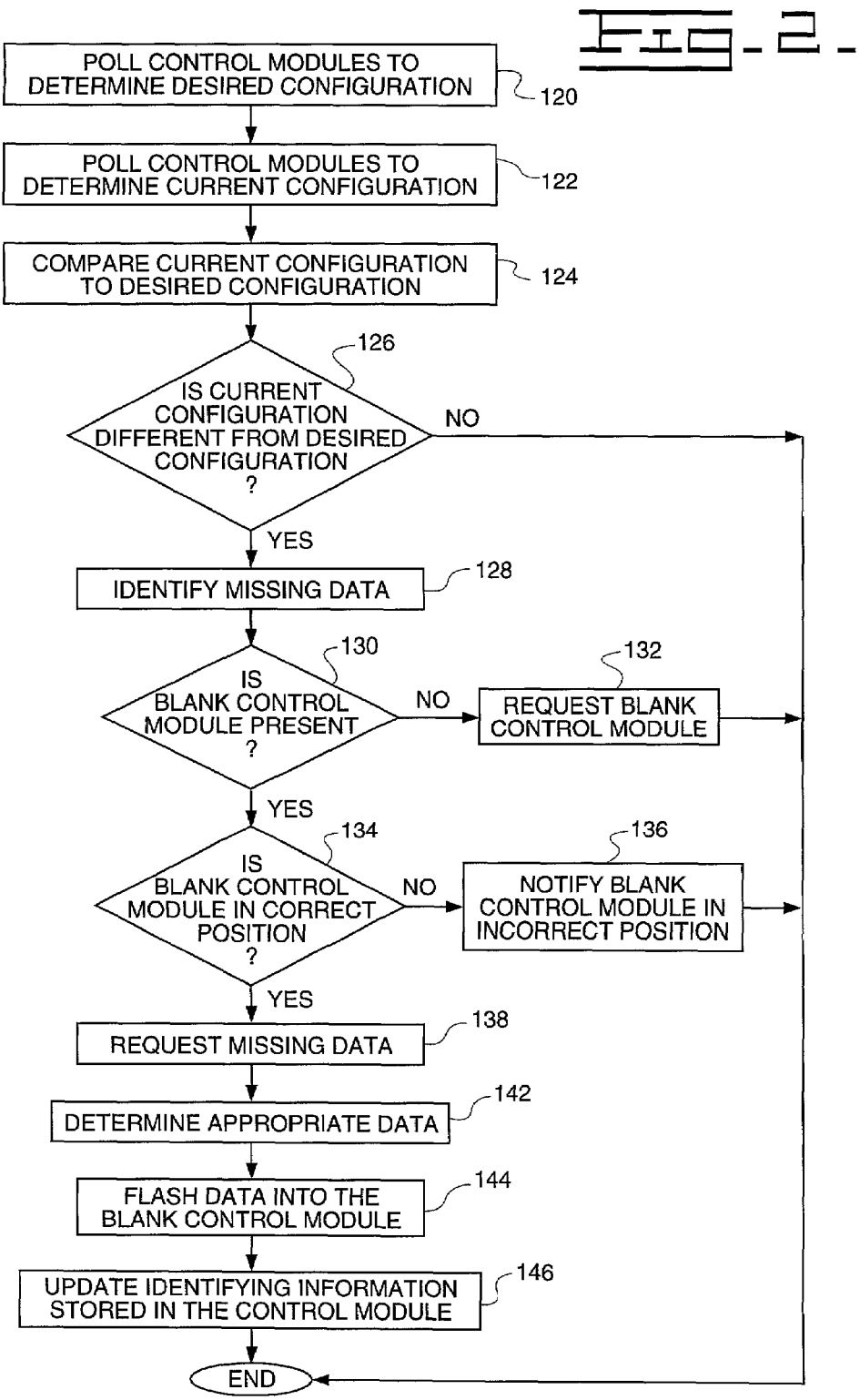

METHOD AND APPARATUS FOR INSTALLING DATA IN A MEMORY ON A WORK MACHINE

TECHNICAL FIELD

The present invention generally relates to work machines having one or more control modules for controlling and monitoring components of the work machine and, more particularly, to replacement of the control module and the associated software file.

BACKGROUND

Modern work machines contain many embedded electronic control and monitoring systems, which control and operate the machine and machine components and monitor the condition of the machine, its systems, and components. The control and monitoring systems are typically comprised of several electronic control modules, each of which has an individual function. For example, one module may control the engine and a second module may monitor the condition of the engine, i.e. temperature, speed, and the like.

The control modules conventionally contain field reprogrammable non-volatile memory, also known as "flash" memory, which allows the software stored on the module to be modified or replaced without replacing the module.

Thus, new versions of the software or "bug fixes" may be flashed into the memory of the control module by a service technician without removing the module from the machine. However, as work machines are frequently located in remote areas and may be transferred from one work site to another, it can be difficult and expensive to locate a specific machine and send out a service technician to install new or updated software.

Further, when a control module itself needs to be replaced due to damaged or malfunctioning hardware, it is typically replaced with a blank module upon which a service technician then flashes the appropriate software, in order to save on inventory costs. This requires that the technician have the appropriate software with him or her for the on-site visit, which can be difficult due to the variety of work machines and control modules used on each machine.

A similar problem was addressed by U.S. Pat. No. 5,974,312 issued to Hayes, Jr., et al. This patent, which addressed the need to update the memory of cellular phones with software upgrades or "bug fixes," disclosed a "wireless programmer" which established a signal with the phone or wireless device to reprogram its flash memory. The wireless programmer established a two-way data link with the device to be programmed; when the device identified such a link, it verified the signal and used the transferred data to re-program its memory.

The wireless programmer then stored an identification number of the device and associated software updates.

However, Hayes, Jr., et al. did not address the need for the machine itself to identify which software updates are needed. In Hayes, Jr., et al. the wireless programmer dictates what updates the electronic device will receive.

Thus, a technician or other personnel must determine the appropriate software, store it in the wireless programmer, and direct the wireless programmer to send the specified software.

The present invention is directed to solving the problem of providing the correct software to blank control modules installed on a work machine, thus eliminating the problems encountered when replacing hardware on a machine and lessening the need for skilled service technicians to make service calls to upgrade software on a machine.

However, as can be imagined, the problems inherent in updating software on control modules of work machines is similar to the problems found in updating software in the non-volatile memory of all electric devices. Therefore even though the present invention is disclosed in relation to a work machine, the invention is applicable in many fields.

SUMMARY OF THE INVENTION

The present invention includes a method and apparatus for updating software in a control module.

In a first aspect of the invention, the method includes the steps of storing in at least a portion of at least a first memory at least one identifier associated with data desired to be stored in at least a second memory, reviewing said at least one stored identifier for missing data, requesting said missing data from a data storage system, and storing said missing data in at least one of said plurality of memories when said missing data is received from said data storage system.

In the first aspect of the invention, the apparatus includes a plurality of non-volatile memories on the machine, at least one of said memories having data stored therein, at least a portion of at least one of said memories storing at least one identifier associated with data desired to be stored in at least a second memory, a data storage system for storing said at least one identifier and associated data, and a processor for reviewing said at least one stored identifier for missing data, requesting from said data storage system said missing data by relaying said associated identifier to said data storage system, and storing said requested data in at least one of said plurality of memories when received from said data storage system.

In a second aspect of the invention, the method includes the steps of reviewing onboard the machine the plurality of memories for missing data, obtaining said missing data from a data storage system located remotely from said machine through a communications system, and storing said missing data in at least one of said plurality of said memories onboard the machine.

In the second aspect of the invention, the apparatus includes a data storage system located remotely from the machine for storing data associated with the machine and a processor onboard the machine for reviewing the plurality of memories for missing data, requesting from said data storage system said missing data, and storing said requested data in at least one of said plurality of memories.

BRIEF DESCRIPTION OF THE DRAWINGS

FIG. 1 is a diagrammatic representation of the present invention; and

FIG. 2 is a flow diagram illustrating the requesting and downloading of software.

DETAILED DESCRIPTION

A system for requesting and downloading software according to the preferred embodiment of the present invention is illustrated in FIG. 1 and generally designated 10. For purposes of this disclosure, the present invention is described in connection with a remotely-located work machine, such as a track-type tractor, grader, paver, or the like. However, the present invention is equally well-suited for use with other equipment or machines having control modules or other non-volatile memory storage.

I. The Request and Download System

The system 10 preferably includes an onboard system 100, a memory system 102, and an off board system 104. The onboard system 100 is preferably mounted on the work machine. Alternatively, the onboard system 100 may have a portion located on the machine and a portion located remotely from the machine. The memory system 102 is preferably located on the work machine. The off board system 104 is preferably located remotely from the work machine.

In the preferred embodiment, the onboard system 100 includes a processor 106 and a communications system 108. The processor 106 controls the functions of the onboard system 100 and processes data received from or sent to the off board system 104 via the communications system 108. The communications system 108 communicates with the off board system 104. Preferably, the communication system 108 communicates by wireless communication means, such as satellite or cellular technology, which are well-known by those skilled in the art. However, the communication system 108 may include an alternate communication means, such as a modem with access to public telephone lines.

The memory system 102 is preferably comprised of a control system 110 for a work machine. The control system 110 includes a plurality of control modules 112, each of the modules having field programmable nonvolatile memory, also known as "flash" memory. Within the flash memory of each control module 112 is stored software which controls or monitors components of the work machine. In FIG. 1, the control system 112 is depicted as being comprised of three control modules 112; however, the present invention is equally applicable for control systems having a greater or lesser number of control modules. In the alternative, the memory system 102 may be comprised of a plurality of discrete non-volatile memory locations on an electronic device, each of the locations containing software or data.

The off board system 104 is preferably comprised of a processor 114, a communications system 116, and a data storage system 118. The processor 114 controls the functions of the off board system 104 and processes data received from or sent to the off board system 114 via the communications system 116. The processor 114 may be comprised of a single control unit, or it may be comprised of a more complicated control system, such as one utilizing numerous servers, depending on the complexity of the off board system 116 needed for specific applications. Preferably, the communications system communicates with the onboard system 100 by wireless communication means, such as satellite or cellular technology, which are well-known by those skilled in the art. However, the communications system 116 may include an alternate communication means, such as a modem with access to public telephone lines. The data storage system 118 preferably includes storage space for a software identifier, such as an ID or part number, and the associated software file. The data storage system 118 may be accessed by the processor 114 of the off board system 104.

II. Operation of the Request and Download System

Operation of the system 10 is controlled by software that is programmed into the onboard and off board processors by external means. Alternatively, the program can be implemented via hardware or any other programming technique. Creation of this software based upon the description set forth in the specification is within the capabilities of one having ordinary skill in the programming arts.

Typically, work machines in remote locations indicate, through error codes relayed to back offices, that a control module or software is malfunctioning and a service call is needed. In addition, work machines usually have regularly scheduled maintenance programs during which the machine is serviced and software installed in the control modules is upgraded with new versions. Preferably, during such a service call, a technician begins the process seen in FIG. 2; this process may begin automatically upon every start up of the machine such that the technician need only to start the machine to initiate the process, or the process may be begun by the technician's providing a code via a service tool, a process well known to those skilled in the art.

As seen in FIG. 2, the processor of the onboard system 100 polls the control modules 112 of the memory system 102 to determine which software, or data, should be present on the control modules 112 to determine a desired configuration for the machine. Preferably, each control module 112, in addition to having software installed to control and monitor components of the work machine, also stores information about the software installed on at least one of the other control modules 112 in the memory system 102 of the machine, preferably information such as a software part number or other identifier. Each control module 112 may store identifying information on the software installed on all of the other control modules 112; alternatively, each control module 112 may store information regarding a subset of the control modules 112. For example, each control module 112 may store a software part number identifying the software installed on two of the other control modules 112; therefore, if one control module 112 malfunctions, during a poll of the remaining modules 112, two of them will provide information regarding the software which should be installed on the malfunctioning module 112, and two other modules 112 will provide duplicate information that was stored on the malfunctioning module 112. Thus, when each control module 112 is polled, the processor 106 can determine a desired configuration, preferably comprised of software part numbers to identify the software which should be present in the control modules 112 on the work machine. The processor 106 may store this information in temporary storage or memory (not shown).

In the next step, the processor 106 preferably polls all of the control modules 112 currently installed to determine the actual software present on each of them, creating a current configuration comprised of software part numbers. This current configuration is also preferably placed in a temporary storage or memory space (not shown). Then, the current configuration is compared to the desired configuration by the processor 106 to determine if any portion of the desired configuration, i.e. any specific software, is missing from the machine. If the correct software is installed, the processor 106 ends the sequence and may store a code that such a check was made for future diagnostic purposes.

Preferably, as discussed above, the processor 106 moves through this portion of the sequence on each start-up of the machine to determine if the machine is operating with the correct control and monitoring systems. Alternatively, or in addition, the processor 106 can be forced to complete this initial sequence of the first four steps by a technician either by means of a button, switch, or other onboard device or through the use of a service tool in a manner well known in the art.

However, if the processor 106 determines that the correct software is not installed, it identifies, from the comparison of the desired and current configurations, the specific software which is missing. Next, the processor 106 determines if a blank control module 112 is present and, if so, if it is occupying the position in which the missing software should be installed. If no blank modules 112 are present, the processor requests that such a module 112 be installed. This request may be accomplished by displaying the request on a screen onboard the machine, an auditory signal, or other onboard means. In addition, the processor 106 may communicate such a request to a service tool attached to the machine, or, via the communications system 108, the processor 106 may make such a request to the off board system 104 from which it may be relayed to a service technician. Once the request is made, the sequence is preferably ended. When a blank module 112 is installed, the technician may force the processor 106 to repeat the sequence, either by restarting the machine or by use of a service tool, as discussed.

If a blank control module 112 is present on the machine, the processor 106 verifies that the control module 112 is in the position corresponding to the missing software. If it is not, the processor 106 relays a message indicating that the position of the blank control module 112 does not correspond to the needed software. Such a message may be relayed in a similar fashion as the message requesting a blank control module 112. Once the request is made, the sequence of steps preferably is ended. Then, once the blank module 112 is installed correctly, the technician may begin the entire sequence, either by restarting the machine or by use of a service tool.

Once the processor 106 has verified a blank control module 112 is in the position corresponding to the needed software, the processor 106 requests the missing software. The communications system 108, preferably by way of the wireless means, communicates with the communications system 116 of the off board system 104 and passes the software part number of the missing piece of software. The processor 114 of the off board system 104 receives the part number via the communications system 116 and, in the data storage system 118, looks up the corresponding software code files and typically selects the file which contains the newest version of the code. The off board processor 114 relays a copy of the file through the communications systems 108 and 116 to the onboard system 100, where the processor 106 receives the file and flashes it into the memory of the blank module 112.

Preferably, whenever software is installed on a control module 112, the identifying information stored on the control modules 112 is updated. The newly installed module 112 may have identifying information for another one or more modules 112 stored upon it, and the one or more other modules 112 which stored information identifying the software to be installed on the new module 112 is updated due to the possibility that a newer version of software was installed during the last update. Alternatively, rather than identifying the specific information which needs to be updated, the processor 106 can perform a global update and refresh all of the identifying information stored on the control modules 112.

INDUSTRIAL APPLICABILITY

The present invention provides an efficient method and apparatus for installing software into one or more blank control modules 112 of a work machine. Work machines are often assigned to remote work sites, making it difficult for a technician to reach the machine for maintenance or to update the onboard software. In addition, control modules 112 typically are not stored in inventory with software pre-loaded due to the variety of software used on work machines. Thus, when a technician makes a service call on a machine to update software or to replace a malfunctioning control module 112, he or she will typically install a blank control module 112, then flash the appropriate software into its memory; this, in the past, has necessitated that the technician carry the appropriate software on the service call.

If the software initially taken to the worksite is incorrect, which is often the case due to the variety of software used on the machines, the technician must return to the office to select the correct software and then return to the work site to complete the service call. This may especially be the case if a technician travels to a remote work site to perform maintenance on several machines because he or she may need several different software files for upgrades, and, in some instances, the technician may be unsure as to the exact nature of a hardware malfunction, necessitating that he or she bring many disparate files on the service call.

Utilizing the present invention, the technician, while on a service call, simply replaces the malfunctioning or outdated control module 112 with a blank module 112. Then, the onboard system 100 determines which software should be installed on the blank module 112 and communicates this information to the off board system 104. The software is downloaded and flashed into the memory of the blank module 112, thus eliminating any additional trips to the work site by the technician.

The above descriptions are those of preferred embodiments of the invention. Other aspects, objects, and features of the present invention can be obtained from a study of the drawings, the disclosure, and the appended claims.

What is claimed is:

1. A method for storing data in a non-volatile memory on a work machine, the work machine including a plurality of discrete non-volatile memories, comprising:

mounting the plurality of discrete non-volatile memories on the work machine, wherein at least one of said plurality of discrete non-volatile memories is disposed within an engine electronic control module;

storing in at least a portion of a first discrete memory an identifier associated with data desired to be stored in a second discrete memory;

comparing said stored identifier with data stored in said second discrete memory using a machine processor to identify missing data;

requesting said missing data from a data storage system that is remote from said work machine; and storing said missing data in at least one of said plurality of discrete memories when said missing data is received from said data storage system.

2. The method, as set forth in claim 1, wherein said comparing step includes the steps of:

determining a desired configuration by identifying said desired data from said identifier stored in said first discrete memory;

determining a current configuration by identifying data currently stored in the plurality of discrete memories; and comparing said desired configuration to said current configuration to determine said missing data.

3. The method, as set forth in claim 2, wherein said requesting step includes requesting said missing data from said data storage system by relaying said identifier associated with said missing data.

4. The method, as set forth in claim 2, wherein said step of determining the desired configuration includes the step of polling said plurality of discrete memories with a machine processor to retrieve said identifier stored in said first discrete memory.

5. A method, as set forth in claim 1, wherein said identifier is an identifier associated with data previously stored on said work machine.

6. A method, as set forth in claim 1, wherein the step of comparing said identifier includes the step of reviewing said identifier for missing data previously located on said work machine.

7. A method for storing data in a non-volatile memory on a work machine, the work machine including a plurality of discrete non-volatile memories, at least one of said discrete memories having identifying data stored therein that indicates what data should be stored on an other one of said discrete memories, comprising:
  mounting the plurality of discrete non-volatile memories on the work machine, wherein at least one of said plurality of discrete non-volatile memories is disposed within an engine electronic control module;
  comparing the identifying data with data stored in said other one of said discrete memories to identify missing data that was previously located on said work machine;
  obtaining said missing data from a storage system located remotely from said work machine through a communications system; and
  storing said missing data in at least one of said plurality of said discrete memories onboard the work machine.

8. The method as set forth in claim 7, wherein said comparing step includes the steps of:
  determining with a machine processor onboard the work machine a desired configuration by identifying data desired to be stored in said plurality of discrete memories;
  determining onboard the work machine a current configuration by identifying data currently stored in said plurality of discrete memories; and
  comparing onboard the work machine said desired configuration and said current configuration to identify said missing data not present in one of the discrete memories of the current configuration but present in the desired configuration.

9. The method, as set forth in claim 8, further including a first step of:
  storing in at least a portion of at least a first discrete memory at least one identifier associated with data desired to be stored in at least a second discrete memory, and
  wherein said first determining step includes determining said desired configuration by identifying said desired data from said at least one identifier stored in said at least first discrete memory.

10. The method, as set forth in claim 9, wherein said first determining step includes polling said plurality of discrete memories to retrieve said at least one identifier stored in said at least first discrete memory.

11. A method, as set forth in claim 7, wherein said communication includes a wireless communication system.

12. An apparatus for storing data in a non-volatile memory in a work machine, the work machine including a plurality of discrete non-volatile memories, comprising:
  a control system of the work machine including the plurality of discrete non-volatile memories mounted on the work machine, wherein at least one of said plurality of discrete non-volatile memories is disposed within an engine electronic control module;
  a data storage system located remotely from the work machine for storing data associated with each of said discrete non-volatile memories of the work machine; and
  a processor onboard the work machine for comparing an identifier located in a first discrete memory that identifies data that should be present in a second discrete memory with data stored in said second discrete memory to identify missing data, requesting from said data storage system said missing data, and storing said requested data in at least one of said plurality of discrete memories.

13. The apparatus, as set forth in claim 12, wherein said processor determines a desired configuration by identifying data desired to be stored in said plurality of discrete memories and determines a current configuration by identifying data currently stored in said plurality of discrete memories.

14. The apparatus, as set forth in claim 13, wherein said missing data is not present in one of said discrete memories of the current configuration but present in the desired configuration.

15. The apparatus, as set forth in claim 13, wherein said processor determines said desired configuration by identifying said desired data from said at least one identifier stored in said at least one discrete memory.

16. The apparatus, as set forth in claim 15, wherein said processor polls said plurality of discrete memories to retrieve said at least one identifier stored in said at least one discrete memory.

17. The apparatus, as set forth in claim 15, further including:
  a communications system for communicating between said processor and said data storage system.

18. An apparatus for storing data in a non-volatile memory in a work machine comprising:
  a plurality of non-volatile discrete memories mounted on the work machine, at least one of said discrete memories having data stored therein and being disposed within an engine electronic control module, at least a portion of at least one of said discrete memories storing at least one identifier associated with data desired to be stored in at least a second discrete memory;
  a data storage system for storing said at least one identifier and associated data, and being located remotely from the work machine; and
  a processor for comparing said at least one stored identifier from said first discrete memory with actual data stored in said second discrete memory to identify missing data, requesting from said data storage system said missing data by relaying said associated identifier to said data storage system, and storing said requested data in at least one of said plurality of discrete memories when received from said data storage system.

19. The apparatus, as set forth in claim 18, wherein said processor determines a desired configuration by identifying data desired to be stored on the work machine in the plurality of discrete memories from said at least one identifier stored in said at least one discrete memory and determines a current configuration by identifying said data currently stored in said plurality of discrete memories.

20. The apparatus, as set forth in claim 19 wherein said missing data is data not present in on one of said discrete memories of the current configuration but present in the desired configuration.

21. The apparatus, as set forth in claim 18, wherein said processor further polls said plurality of discrete memories to retrieve said at least one identifier stored in said at least one discrete memory.

22. The apparatus, as set forth in claim 18, wherein said processor is located on said work machine.

23. The apparatus, as set forth in claim 18, further including: a communications system for communicating between said processor and said data storage system.

24. An apparatus, as set forth in claim 18, wherein said identifier is an identifier associated with data previously stored on one of said discrete memories of said work machine.

25. A method for storing data in a non-volatile memory on a machine, the machine including a plurality of discrete non-volatile memories comprising;
   storing in at least a portion of a first discrete memory an identifier associated with data desired to be stored in a second discrete memory;
   comparing said stored identifier with data stored in said second discrete memory using a machine processor to identify missing data;
   requesting a replacement non-volatile discrete memory be installed in response to said missing data;
   requesting said missing data from a data storage system that is remote from said machine; and
   storing said missing data in at least one of said plurality of discrete memories when said missing data is received from said data storage system.

26. A method for storing data in a non-volatile memory on a machine, the machine including a plurality of discrete non-volatile memories, comprising:
   storing in at least a portion of a first discrete memory an identifier associated with data desired to be stored in a second discrete memory;
   comparing said stored identifier with data stored in said second discrete memory using a machine processor to identify missing data;
   requesting said missing data from a data storage system that is remote from said machine;
   storing said missing data in at least one of said plurality of discrete memories when said missing data is received from said data storage system;
   determining whether a blank non-volatile discrete memory is located on said machine; and
   relaying off of said machine an indication that the blank non-volatile discrete memory does not correspond to said missing data.

27. A work machine comprising:
   a plurality of discrete control modules mounted on the work machine that each include a first memory and a second memory, wherein at least one of the plurality of discrete control modules is an engine electronic control module;
   each said first memory being for data specific to that respective control module, and each said second memory including identifier data that identifies what data should be stored in each first memory of the plurality of discrete control modules;
   a machine processor operably connected to said discrete control modules;
   means, including said machine processor and said identifier data, for comparing the identifier data of each second memory to actual data stored in each first memory to identify missing data; and
   means, including said machine processor, for automatically retrieving said missing data from a data storage system that is remote from the work machine.

\* \* \* \* \*